United States Patent [19]

Nishizawa

[11] Patent Number: 5,138,606
[45] Date of Patent: Aug. 11, 1992

[54] DISK DRIVE DEVICE HAVING A SWINGABLE LEVER CARRYING PIN AND POSITIONED IN A SPACE BETWEEN A ROTARY PLATE AND A MAGNETIC MEMBER MOUNTED ON THE ROTARY PLATE

[75] Inventor: Hiroshi Nishizawa, Hanamaki, Japan

[73] Assignee: Matsushita Electric Industrial Co., Ltd., Osaka, Japan

[21] Appl. No.: 734,742

[22] Filed: Jul. 23, 1991

[30] Foreign Application Priority Data

Jul. 30, 1990 [JP] Japan .................. 2-202138

[51] Int. Cl.$^5$ .................. G11B 17/03; G11B 23/00; G11B 25/00
[52] U.S. Cl. .................. 369/270; 369/271; 360/99.12
[58] Field of Search .................. 369/270, 271; 360/99.12, 99.04, 99.05, 98.05, 98.08

[56] References Cited

U.S. PATENT DOCUMENTS

| | | | |
|---|---|---|---|
| 4,667,257 | 5/1987 | Chan | 360/99.04 X |
| 4,700,245 | 10/1987 | Sakaguchi | 360/99.12 X |
| 4,742,408 | 5/1988 | Kumagai | 360/99.04 X |
| 4,855,850 | 8/1989 | Nakaoka et al. | 360/99.12 |
| 4,864,442 | 9/1989 | Miyazawa et al. | 360/99.12 |
| 4,903,155 | 2/1990 | Maekawa et al. | 360/99.12 X |
| 5,010,427 | 4/1991 | Taguchi et al. | 360/99.12 X |

FOREIGN PATENT DOCUMENTS 64-78462 3/1989 Japan .

*Primary Examiner*—Stuart S. Levy
*Assistant Examiner*—Tien Ba Pham
*Attorney, Agent, or Firm*—Stevens, Davis, Miller & Mosher

[57] ABSTRACT

A disk drive device incorporated in a disk apparatus has a rotary plate mounted on a rotary drive shaft and a magnet mounted on the rotary plate. A recess is formed in the lower surface of the magnet or the upper surface of the rotary plate. A swingable lever having a first end portion pivotally connected to the rotary plate is accommodated in the recess. A second end portion of the swingable lever carries a disk drive pin movably disposed in an opening formed in the magnet. Before the disk drive pin engages with a drive pin engagement hole of a disk, the disk drive pin is depressed in a direction parallel to the axis of the rotary drive shaft by the disk magnetically attracted by the magnet toward the rotary plate. At this time, the second end portion of the swingable lever resiliently deforms away from the magnet. The rotary plate is formed therein with an opening for receiving the deformed second end portion of the swingable lever, thus allowing the thickness of the entire device to be reduced.

6 Claims, 3 Drawing Sheets

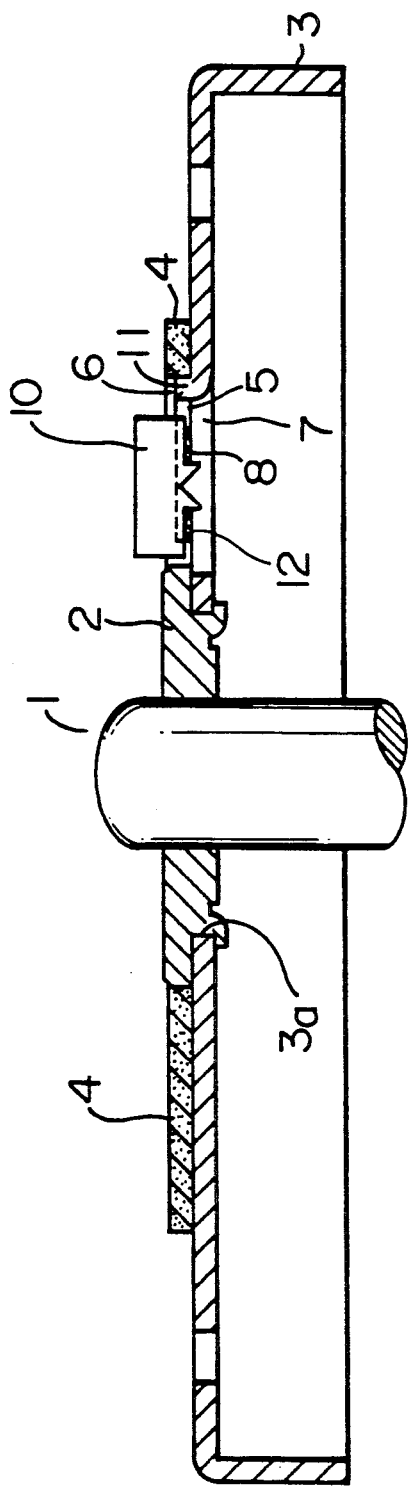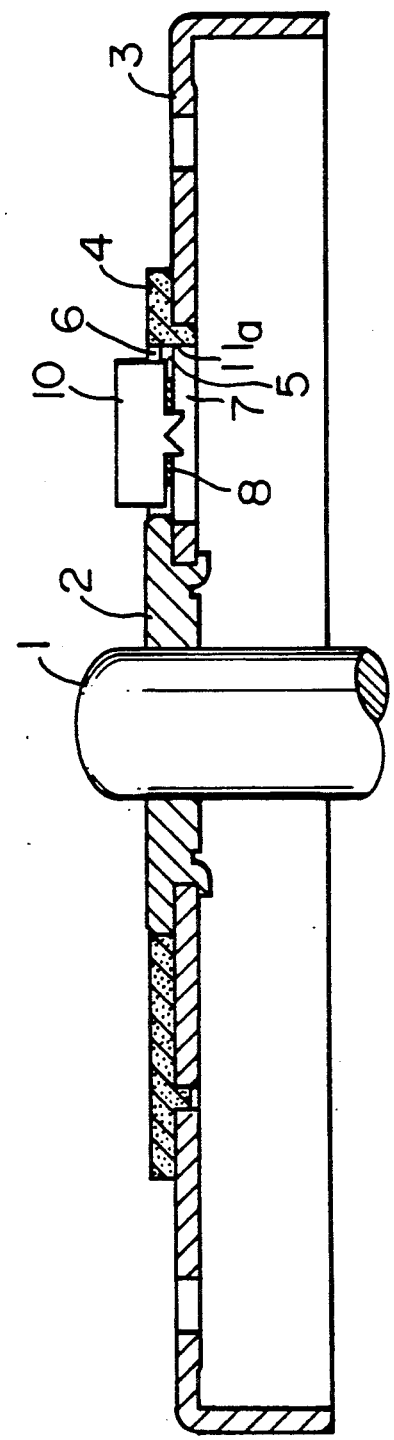

DISK DRIVE DEVICE HAVING A SWINGABLE LEVER CARRYING PIN AND POSITIONED IN A SPACE BETWEEN A ROTARY PLATE AND A MAGNETIC MEMBER MOUNTED ON THE ROTARY PLATE

BACKGROUND OF THE INVENTION

The present invention relates to a device for driving and thus rotating a disk (hereinafter referred to as "a disk drive device") which is incorporated in a disk apparatus.

A conventional disk drive device of this type has a structure such as that disclosed in, e.g., Japanese Patent Unexamined Publication No. 64-78462. To describe the outline of the conventional device, a rotary plate is mounted on a rotary drive shaft and integrally rotatable therewith. A swingable lever has its proximal end portion pivotally supported by the lower surface of the rotary plate in such a manner that the lever is also movable in the axial direction of the rotary drive shaft. The swingable lever is urged by a spring toward the rotary plate. A drive pin is provided on a distal end portion of the swingable lever and extends through a hole formed in the rotary plate and also through another hole formed in a magnet mounted on the rotary plate so as to magnetically attract a disk.

When a disk is placed on the rotary plate with a central hole of the disk fitted onto the rotary drive shaft, the disk is magnetically attracted by the magnet. In this condition, a drive pin engagement hole formed in the disk at a position eccentric to the center of the disk is not aligned with the drive pin. Therefore, the drive pin is pushed downward by the disk, so that the drive pin and the swingable lever are lowered from the disk against the force of the spring. When the rotary drive shaft is rotated by a motor of the disk apparatus, the rotation causes the rotary plate and the swingable lever to rotate. The disk, however, is held by a magnetic head of the apparatus and does not rotate until the drive pin engages with the drive pin engagement hole of the disk. This engagement causes the torque of the rotary plate to be transmitted through the drive pin to the disk, thereby causing the disk to rotate.

In the conventional disk drive device, the swingable lever is, as described above, supported by the lower surface of the rotary plate in such a manner as to be movable in the axial direction of the rotary shaft so that the drive pin of the swingable lever is engageable with the drive pin engagement hole of the disk. This arrangement requires clearances to be provided in order to prevent unnecessary contact between the swinging lever and other component parts, thus making it impossible to reduce the thickness of the entire device. The conventional device has another drawback that a costly spring for applying spring force to the swinging lever is required.

SUMMARY OF THE INVENTION

The present invention has been made to eliminate such drawbacks of the conventional device. An object of the present invention is to provide a disk drive device constructed such that the swinging lever is accommodated within the thickness of the disk attracting magnet and/or the rotary plate, thereby enabling a reduction in the thickness of the entire device and such that the structure of the device is simplified to reduce the production cost.

According to the present invention, there is provided a device for driving a disk of the type that has a central hole and a disk drive pin engagement hole at a position radially spaced from the central hole, the device comprising: a rotary drive shaft engageable with the central hole of the disk; a rotary plate mounted on the rotary drive shaft in such a manner as to be rotatable together with the rotary drive shaft; a magnet mounted on one of the major surfaces of the rotary plate in such a manner as to be rotatable together with the rotary plate, the magnet being capable of magnetically attracting the disk; means defining a space between the rotary plate and the magnet; and a swingable lever accommodated in the space and pivotally connected, at a first portion adjacent a first end of the lever, to the rotary plate. The magnet has an opening formed therein at a position adjacent to a first end of the space. The swingable lever has a disk drive pin provided thereon at a second portion adjacent a second end of the lever, the disk drive pin being engageable with the disk driven pin engagement hole of the disk and being movably disposed in the opening of the magnet. At least the second end portion of the swingable lever is resiliently deformable in such a manner as to deflect away from the magnet when the disk drive pin is depressed in a direction parallel to the axis of the rotary drive shaft by the disk when the same is magnetically attracted by the magnet. The rotary plate has receptacle means for receiving the deformed portion of the swingable lever which includes the second end portion.

As described above, the swingable lever carrying the disk drive pin is accommodated by the means which define a space between the rotary plate and the magnet which are disposed in contact with each other, while the rotary plate has the receptacle means for receiving at least the distal end portion of the swingable lever which elastically deforms or deflects when the disk drive pin is depressed in a direction parallel to the rotary drive shaft by the disk when the same is magnetically attracted by the magnet. This arrangement permits the swingable lever to elastically deform without requiring any separate space to be provided in the drive in addition to the dimension of the total of the thickness of the rotary plate and that of the magnet. Therefore, the present invention makes it possible to reduce the thickness of the entire disk drive device, to simplify the structure of the device and to reduce the production cost.

The above and other objects, features, and advantages of the present invention will be more apparent from the following description with reference to the accompanying drawings.

BRIEF DESCRIPTION OF THE DRAWINGS

FIG. 2 is a sectional view taken along the line II—II shown in FIG. 1;

FIG. 3 is a view similar to FIG. 2 but shows a modification to the structure shown in FIG. 2.

DESCRIPTION OF PREFERRED EMBODIMENTS

Figure 1:
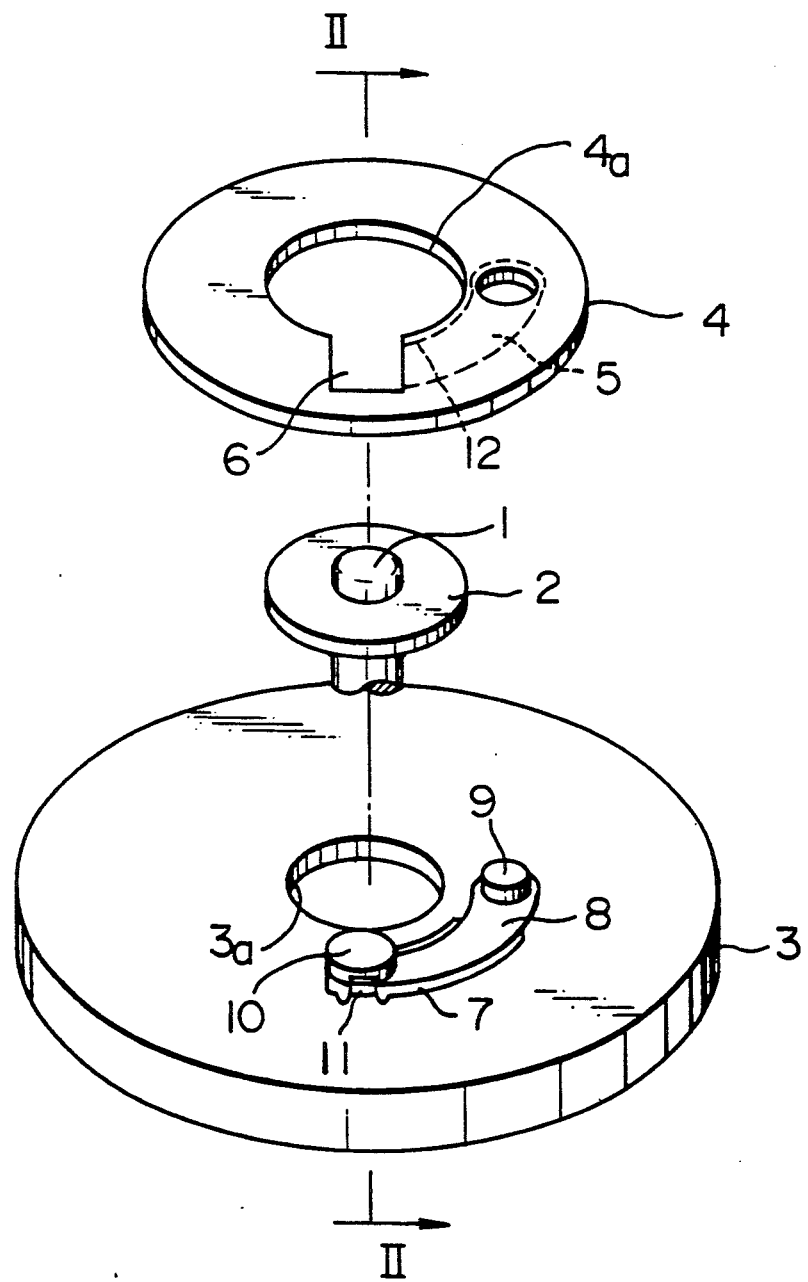
FIG. 1 is an exploded perspective view of an embodiment of a disk drive device according to the present invention.

An embodiment of the present invention will be described with reference to FIGS. 1 and 2.

A rotary drive shaft 1 has an end portion engageable with two adjacent sides of a square central hole of a disk (not shown). A circular hub 2 is secured to the end portion of the shaft 1 which extends through the hub 2. The hub 2 has an outer peripheral portion to which the inner peripheral edge portion of a central hole 3a of a rotary plate 3 is secured, so that the rotary plate 3 is rotatable integrally with the rotary drive shaft 1. An annular magnet 4 for magnetically attracting a disk is mounted on the upper surface of the rotary plate 3 and has a central hole 4a whose inner peripheral edge contacts the outer periphery of the hub 2. A space 5 for accommodating a swingable lever 8 is defined between the magnet 4 and the rotary plate 3 at a position spaced radially outwardly from the rotary drive shaft 1.

In the embodiment illustrated in FIGS. 1 and 2, the space 5 comprises a recess formed in the lower surface (the surface facing the rotary plate 3) of the magnet 4. As indicated by the broken lines in FIG. 1, the recess 5 is of an arcuate shape. The magnet 4 has a notch 6 (serving as an opening of the magnet) formed in the inner peripheral edge of the central hole 4a of the magnet 4 and communicating with a first end of the recess 5. On the other hand, the rotary plate 3 has formed therein an opening 7 aligned with the notch 6 and a part of the length of the arcuate recess 5. Within the recess 5, a first end portion of the swingable lever 8 is pivotally supported by a shaft 9 protruding from the rotary plate 3 in parallel with the rotary drive shaft 1, with the second end of the lever 8 projecting into both of the notch 6 of the magnet 4 and the opening 7 of the rotary plate 3. The swingable lever 8 is formed of a plate spring member (e.g., a sheet of stainless steel or phosphor bronze having a thickness of 08 to 0.20 mm) so that the lever 8 has a flexibility imparted thereto. A drive pin 10 parallel with the rotary drive shaft 1 is provided on and projects from the upper surface of the distal end (the second end) of the swingable lever 8. The drive pin 10 extends through the notch 6 of the magnet 4.

The drive pin 10 is provided to drive a disk and, for this purpose, is engageable with two adjacent sides of a square, drive pin engagement hole formed in the disk at a position eccentric to the center of the disk. In order to achieve such engagement, the swingable lever 8 and the drive pin 10 are pivotally movable through a certain angle about the axis of the shaft 9. The outermost position of the pivotal movement is defined by a stopper 11 projecting from a part of the radially outer edge of the opening 7 of the rotary plate 3, the stopper 11 consisting of a portion of the rotary plate 3 cut and raised at that part of the opening 7. On the other hand, the innermost position of the pivotal movement is defined by another stopper 12 formed by the radially inner edge of the recess 5 in the lower surface of the magnet 4.

Although not shown, the innermost position of the pivotal movement of the swingable lever 8 and the drive pin 10 about the shaft 9 may alternatively be defined by the outer peripheral edge of the hub 2. The outermost position of the pivotal movement may alternatively be defined by a portion 11a of the magnet 4, as shown in FIG. 3. Specifically, in the modification shown in FIG. 3, the portion 11a of the magnet 4 projects into the opening 7 of the rotary plate 7, thereby constituting a stopper. The structure of the device may be such that the distal end of the swingable lever 8 is narrowed, and the drive pin 10 provided on the narrowed end is allowed to abut against the radially inner and outer stoppers.

The operation of the embodiment having the above-described construction will be described below.

When the central hole of a disk is fitted onto the rotary drive shaft 1 and the position of the disk relative to the rotary plate 3 is thus determined, the disk is magnetically attracted by the magnet 4 against the hub 2. In this position, the drive pin engagement hole of the disk is not aligned with the drive pin 10. Therefore, the drive pin 10 is depressed by the lower surface of the disk, thereby causing the swingable lever 8 to deflect downwardly, so that the drive pin 10 and the distal end of the lever 8 are lowered into the opening 7 of the rotary plate 3. Subsequently, the rotary drive shaft 1, the rotary plate 3, the swingable lever 8 and other associated members are rotated. However, the disk, which is held by the magnetic head (not shown) of the disk apparatus, does not rotate until the drive pin 10 slides on the lower surface of the disk into alignment with the drive pin engagement hole of the disk. Upon this alignment, the drive pin 10 is forced into the drive pin engagement hole by the elasticity of the swingable lever 8, more specifically, the ability of the lever 8 to recover its original shape. This is followed by the engagement of the rotary drive shaft 1 and the drive pin 10 with two adjacent sides of the central hole of the disk and those of the drive pin engagement hole of the disk, respectively. The engagement causes the disk to rotate.

As described above, according to the foregoing embodiment of the present invention, when the disk is magnetically attracted by the magnet 4, the swingable lever 8 deflects, causing the drive pin 10 and the distal end portion of the lever 8 to be lowered into the opening 7 of the rotary plate 3. Therefore, the space required to permit the movement of the lever 8 in the axial direction of the rotary drive shaft 1 can be reduced to the minimum necessary dimension, thereby making it possible to reduce the thickness of the entire device.

Figure 4:
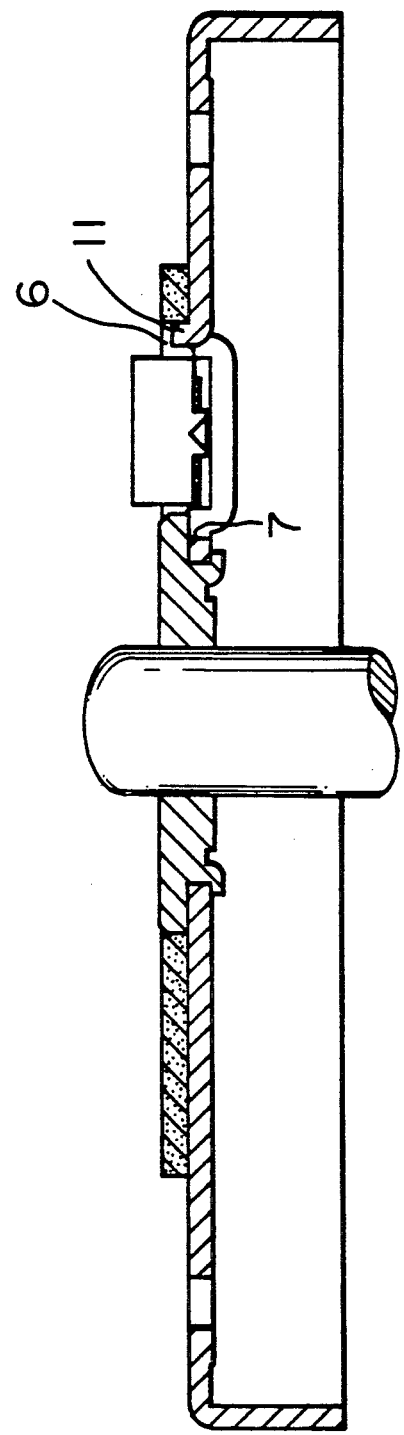
FIG. 4 is a view similar to FIG. 2 but shows another embodiment of the present invention.

Next, a second embodiment of the present invention will be described with reference to FIG. 4.

The second embodiment is substantially the same in construction and operation as the first embodiment except that, in contrast to the first embodiment where the space for accommodating the swingable lever 8 comprises a recess formed in the lower surface of the magnet 4, the space in the second embodiment comprises a recess formed in the upper surface (the surface facing the magnet 4) of the rotary plate 3. In FIG. 4, the component parts of the second embodiment corresponding to those of the first embodiment are denoted by the same reference numerals to omit the description thereof.

It will be apparent from the description given above that similar effect can be achieved in the case where the space for accommodating the swingable lever comprises a recess formed partly in the upper surface of the rotary plate 3 and partly in the lower surface of the magnet 4.

What is claimed is:

1. A disk drive device for driving a disk of the type that has a central hole and a disk drive pin engagement hole at a position radially spaced from said central hole, said device comprising: a rotary drive shaft engageable with said central hole of said disk; a rotary plate mounted on said rotary drive shaft in such a manner as to be rotatable together with said rotary drive shaft; a magnet mounted on one of the major surfaces of said rotary plate in such a manner as to be rotatable together with said rotary plate, said magnet being capable of magnetically attracting said disk; means defining a space between said rotary plate and said magnet; and a swingable lever accommodated in said space and pivotally connected, at a first portion adjacent a first end of said lever, to said rotary plate; said magnet having an opening formed therein at a position adjacent to a first end of said space, said swingable lever having a disk drive pin provided thereon at a second portion adjacent a second end of said lever, said disk drive pin being engageable with said disk drive pin engagement hole of said disk and being movably disposed in said opening of said magnet, at least said second end portion of said swingable lever being resiliently deformable in such a manner as to deflect away from said magnet when said disk drive pin is depressed in a direction parallel to the axis of said rotary drive shaft by said disk when the same is magnetically attracted by said magnet, said rotary plate having receptacle means for receiving the deformed portion of said swingable lever that includes said second end portion.

2. A drive device for driving a disk of the type that has a central hole and a disk drive pin engagement hole at a position radially spaced from said central hole, said device comprising: a rotary drive shaft engageable with said central hole of said disk; a rotary plate mounted on said rotary drive shaft in such a manner as to be rotatable together with said rotary drive shaft; a magnet mounted on one of the major surfaces of said rotary plate in such a manner as to be rotatable together with said rotary plate, said magnet being capable of magnetically attracting said disk; means defining a space between said rotary plate and said magnet; and a swingable lever accommodated in said space and pivotally connected, at a first portion adjacent a first end of said lever, to said rotary plate; said magnet having an opening formed therein at a position adjacent a first end of said space, said swingable lever having a disk drive pin provided thereon at a second portion adjacent a second end of said lever, said disk drive pin being engageable with said disk drive pin engagement hole of said disk and being movably disposed in said opening of said magnet, at least said second end portion of said swingable lever being resiliently deformable in such a manner as to deflect away from said magnet when said disk drive pin is depressed in a direction parallel to the axis of said rotary drive shaft by said disk when the same is magnetically attracted by said magnet, said rotary plate having receptacle means for receiving the deformed portion of said swingable lever that includes said second end portion, wherein said means defining said space comprises a recess formed in that surface of said magnet which faces said rotary plate, said rotary plate having an opening which is formed at a position aligned with said opening of said magnet and which constitutes said receptacle means.

3. A disk drive device according to claim 2, wherein a stopper projects from a part of an edge of said opening of said rotary plate into said opening of said magnet, said stopper defining at least one end of the pivotal movement of said swingable lever.

4. A disk drive device according to claim 2, wherein a stopper projects from a part of an edge of said opening of said magnet into said opening of said rotary plate, said stopper defining at least one end of the pivotal movement of said swingable lever.

5. A disk drive device according to claim 1, wherein said means defining said space comprises a recess formed in that surface of said rotary plate which faces said magnet, said rotary plate having an opening which is formed at a position aligned with said opening of said magnet and which constitutes said receptacle means.

6. A disk drive device according to claim 5, wherein a stopper projects from a part of an edge of said opening of said rotary plate into said opening of said magnet, said stopper defining at least one end of the pivotal movement of said swingable lever.

* * * * *